United States Patent
Elliott

(10) Patent No.: US 8,144,579 B2
(45) Date of Patent: Mar. 27, 2012

(54) WIRELESS PERFORMANCE IMPROVEMENT VIA CLIENT-FREE FORWARD ERROR CORRECTION

(75) Inventor: Brent Elliott, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 199 days.

(21) Appl. No.: 11/824,391

(22) Filed: Jun. 29, 2007

(65) Prior Publication Data

US 2009/0003207 A1 Jan. 1, 2009

(51) Int. Cl.
*G01R 31/08* (2006.01)

(52) U.S. Cl. ..................................... 370/230

(58) Field of Classification Search ............... 370/334, 370/349, 401, 410
See application file for complete search history.

(56) References Cited

U.S. PATENT DOCUMENTS

| | | | | |
|---|---|---|---|---|
| 5,566,170 A * | 10/1996 | Bakke et al. | ............... | 370/392 |
| 6,687,339 B2 * | 2/2004 | Martin | ............... | 379/88.14 |
| 6,707,817 B1 * | 3/2004 | Kadambi et al. | ............... | 370/390 |
| 6,782,490 B2 * | 8/2004 | Maxemchuk et al. | ............... | 714/18 |
| 7,225,249 B1 * | 5/2007 | Barry et al. | ............... | 709/227 |
| 2001/0033639 A1 * | 10/2001 | Martin | ............... | 379/88.14 |
| 2003/0108029 A1 * | 6/2003 | Behzadi | ............... | 370/351 |
| 2003/0223422 A1 * | 12/2003 | Igarashi et al. | ............... | 370/390 |
| 2005/0007982 A1 * | 1/2005 | Miyoshi | ............... | 370/334 |
| 2005/0078653 A1 * | 4/2005 | Agashe et al. | ............... | 370/349 |
| 2005/0100032 A1 * | 5/2005 | Patiejunas | ............... | 370/410 |
| 2005/0249211 A1 * | 11/2005 | Chou et al. | ............... | 370/389 |
| 2006/0056429 A1 * | 3/2006 | Usukura | ............... | 370/401 |
| 2006/0171407 A1 * | 8/2006 | Kim et al. | ............... | 370/432 |
| 2008/0256622 A1 * | 10/2008 | Neystadt et al. | ............... | 726/14 |
| 2008/0316046 A1 * | 12/2008 | Walrant et al. | ............... | 340/825.62 |
| 2009/0003207 A1 * | 1/2009 | Elliott | ............... | 370/230.1 |

OTHER PUBLICATIONS

Fang et al, Forward Error Correction for Multimedia and Teleimmersion Data Stream, Dec. 1, 2000.*

* cited by examiner

*Primary Examiner* — Kwang B Yao
*Assistant Examiner* — Jung-Jen Liu
(74) *Attorney, Agent, or Firm* — Forefront IP Lawgroup, PLLC

(57) ABSTRACT

Packets are duplicated, delayed, and spread in time as a form of forward error correction. If a client device receives duplicate packets, they can be discarded. If one of the duplicate packets is lost, then the duplication provides forward error correction with no change to the device that receives the packet.

5 Claims, 4 Drawing Sheets

WIRELESS PERFORMANCE IMPROVEMENT VIA CLIENT-FREE FORWARD ERROR CORRECTION

FIELD

The present invention relates generally to wireless networks, and more specifically to forward error correction in wireless networks.

BACKGROUND

Wireless networks make a number of tradeoffs when bringing internet protocol (IP) applications onto the wireless medium. In some cases, the choice to not retransmit lost multicast packets is implemented due to the many recipients of each packet. Due to the higher bit error rate of wireless networks versus traditional wireline networks, this can result in unacceptable packet loss and degraded application performance. As an example, multicast or broadcast video in large scale wireless networks can easily exceed 5% packet loss which is many orders of magnitude higher than traditional wireline networks. Due to application characteristics of sending large numbers of packets to represent atomic chunks of information (e.g., keyframes), an application such as multicast video may experience >90% keyframe loss as a result of this 5% packet loss.

In some application scenarios, this provides unacceptable application performance. Traditional solutions to conceal the effects of this packet loss include substantially modified codecs or substantially modified delivery tunnels for these packets. Unfortunately, both solutions typically involve substantial software modifications and in some implementations additional hardware functionality at the client (i.e. laptop, PDA, smartphone) side.

DESCRIPTION OF EMBODIMENTS

Figure 1:
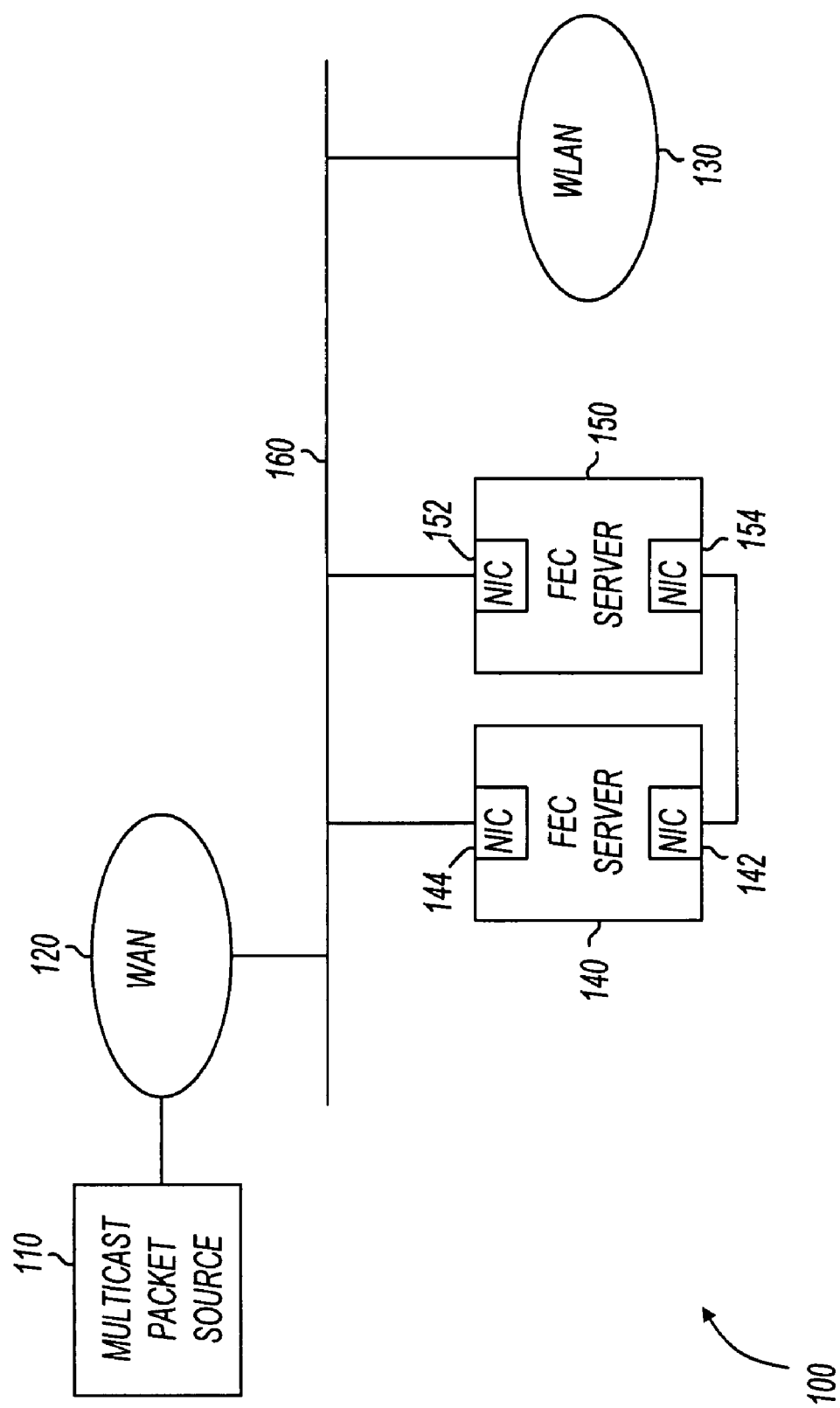
FIG. 1 shows a diagram of a network in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a network in accordance with various embodiments of the present invention. Network 100 includes local wireline network 160, wireless local area network (WLAN) 130, and wide area network (WAN) 120. Network 100 also includes multicast packet source 110 and forward error correction (FEC) servers 140 and 150.

In application scenarios represented by FIG. 1, multicast packet source 110 transmits multicast packets destined for at least one client within WLAN 130. The multicast packets travel to local wireline network 160 from WAN 120 and then reach their destination(s) across at least one wireless link in WLAN 130. Forward error correction servers 140 and 150 are coupled to local wireline network 160 and function to achieve substantial packet loss concealment via an easy-to-implement forward error correction mechanism that requires no modifications and or applications to be added to traditional end-user platforms.

This mechanism is based on intentional duplication of packets intended for the end-user platform (e.g., wireless clients in WLAN 130). The reason this requires no modifications on the client side is that accidental duplication of packets is common in networks and therefore the networking stack of all major operating systems and applications inherently deal with the elimination of unwanted packet duplications. In the event, however, that the first packet was lost—this duplication enables the full recovery of the information contained in the first packet.

Forward error correction servers 140 and 150 duplicate, delay, and spread the multicast packets destined for wireless clients in WLAN 130. The duplication provides the client a second chance to receive a given packet. The performance improvement associated with this is related to the correlation of packet loss between the original packet and the duplicate. Low correlation in loss probability between the original and the duplicate increases the improvement in packet loss experienced within this system. Correlation in loss probability may be reduced in many ways. For example, in some embodiments, duplicated packets are delayed by varying amounts. Due to the burstiness of packet loss on wireless networks due to both channel fading and interference characteristics that span across many packet receptions, given that a packet has been lost, a packet in the very near future has much higher than average loss probability. Thus, the delay of duplicated packets may be increased to decrease this correlation.

The upper bound in tolerable delay may be set by the application itself. For example, a multicast low data rate wireless video solution may tolerate a different maximum packet delay than other types of applications. Further, varying the delay, or "spreading" in time, of packets further decreases the packet loss rate.

In some embodiments, servers 140 and 150 operate on the transport layer between the WAN connection and the wireless network to provide duplication, delay, and spread (DDS) of packets for forward error correction. For example, primary network interface cards (NICs) 152 and 144 may be connected into local wireline network 160. Secondary NICs 154 and 142 are crossover Ethernet connected between the two servers. Server 150 may provide a layer 2 and layer 3 firewall and transparently bridge between primary NIC 152 and secondary NIC 154. This firewall blocks all frames and packets except the packets to be duplicated. For the example scenario being described here, this may be multicast IP/UDP packets to a particular destination address/port.

Server 140 provides transparent bridging between secondary NIC 142 and primary NIC 144 and also implements a delay per packet. As an example, this can be implemented with a quality of service (QoS) policy such as the netem QoS policy commonly available on Linux platforms to perform network emulation functions. By implementing a QoS policy that effects both a latency and a jitter on the packets as they are bridged through the device, the packets are delayed and spread in the time domain. By bridging back onto the original network with the original packets, packets are duplicated.

In some embodiments, additional functionality is provided to prevent the duplicate packets from being re-duplicated using the same process; otherwise a loop will occur. Preventing re-duplication can be accomplished in many ways. For example, in some embodiments, server 140 modifies a value (such as time-to-live "TTL") of the multicast packets to a known value, and server 150 is configured to not permit these modified packets through its bridge. As an example, and not by way of limitation, server 150 may be configured to only pass multicast packets to a specific multicast address with TTL=122. In this same example, server 140 may then implement simple packet mangling to rewrite TTL=122 to TTL=99. These TTL=99 packets are then delayed and spread using server 140, and since they no longer match the criteria for bridging in server 150, they are not duplicated unnecessarily.

In some embodiments, the packet mangling may be performed using the WAN emulator functionality of the netem QoS Policy which as an example can be implemented directly by iptables which is again a commonly available component in the Linux platform.

Forward error correction servers 140 and 150 are shown as two separate servers, although this is not a limitation of the present invention. For example, a single server may provide both the packet filtering and delay and spread functions. The forward error correction embodiments are described above in the context of multicast packets in a wireless network, but this is not a limitation of the present invention. For example, the forward error correction provided by the duplication, delay, and spread (DDS) of packets may be used with any type of packet in any network, and is not limited to multicast packets or wireless networks.

Forward error correction servers 140 and 150 are each shown with two NICs, although this is not a limitation of the present invention. For example, FEC server 140 may have a single physical NIC that couples the server to wireline network 160 and server 150. Further, in some embodiments, FEC server 150 may have a single physical NIC that couples the server to wireline network 160 and server 140.

In some embodiments, additional packet duplication may be provided within either FEC server 140 or 150. These embodiments provide higher packet loss resiliency at a higher overhead cost. An example of such an implementation is using the netem duplication function which will generate an arbitrary number of copies of the original packet. Further, disabling the operation of FEC servers 140 and 150 has no impact on any existing services and merely removes the beneficial duplication and time handling of the target packet streams.

Figure 2:
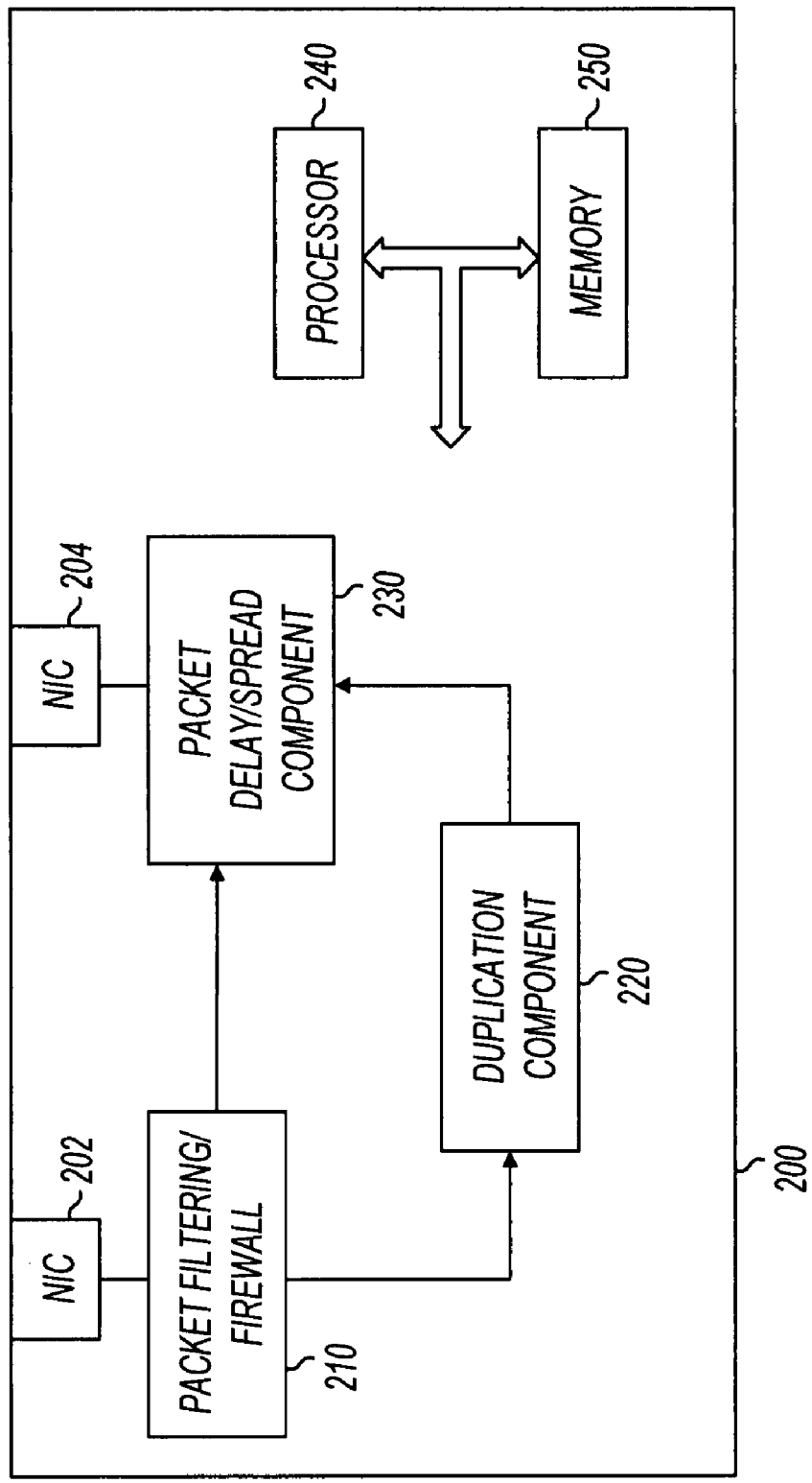
FIG. 2 shows a diagram of a forward error correction server in accordance with various embodiments of the present invention.

FIG. 2 shows a forward error correction server in accordance with various embodiments of the present invention. Forward error correction server 200 may be used in place of the combination of FEC servers 140 and 150 in FIG. 1. Forward error correction server 200 includes NICs 202 and 204, packet filtering/firewall component 210, duplication component 220, packet delay/spread component 230, processor 240, and memory 250.

In operation, NICs 202 and 204 are coupled to a wireline network such as wireline network 160 (FIG. 1). In some embodiments, NICs 202 and 204 are implemented as one physical NIC coupled to a wireline network. Packet filtering/firewall component 210 allows certain packets to enter FEC server 200 and blocks all others. The packets allowed to enter are destined for network nodes other FEC server 200, so a duplicate packet is created when a packet passes through packet filtering/firewall component 210. As described above with reference to FIG. 1, packet filtering/firewall component 210 may use any criteria to determine which packets are to be duplicated. In some embodiments, the packets are multicast packets destined for nodes in a wireless network.

The duplicate packets are delayed and spread by packet delay/spread component 230. In some embodiments, each packet is delayed by a different amount, and the duplicate packets are therefore spread out in time. Any algorithm may be used to determine individual packet delay values without departing from the scope of the present invention. Delayed and spread duplicate packets are then provided to NIC 204 for retransmission back on the wireline network.

In some embodiments, multiple duplicate packets are produced. For example, duplication component 220 may be configured to create multiple duplicate packets, which are then delayed and spread by packet delay/spread component 230.

Processor 240 may be any type of processor, including a microprocessor, digital signal processor, or microcontroller. Memory 250 may be any type of storage device capable of storing data or instructions for access by processor 240. Examples include but are not limited to, static random access memory (SRAM), dynamic random access memory (DRAM), flash memory, or hard disk.

In some embodiments, processor 240 and memory 250 work to configure the various components of FEC server 200. For example, processor 240 may access instructions stored in memory 250 and configure the firewall functions or the delay and spread functions. Also for example, processor 240 may turn on and off duplication component 220. In some embodiments, processor 240 and memory 250 may implement one or more the components shown in FIG. 2. For example, packet filtering/firewall component may be implement in software, and the software may be stored as instructions in memory 250. Further, duplication component 220 and/or packet delay/spread component 230 may also be implemented in software. The various components of FEC server 200 may be implemented in hardware, software, or any combination without departing from the scope of the present invention.

Figure 3:
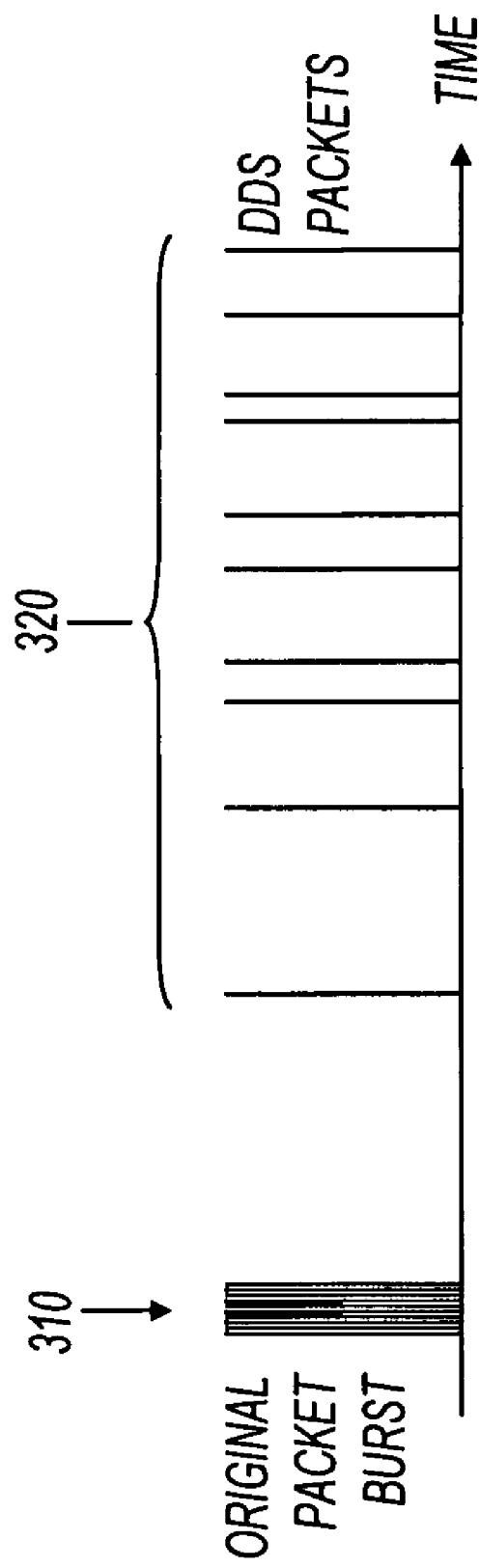
FIG. 3 shows a packet burst being duplicated, delayed, and spread.

FIG. 3 shows a packet burst being duplicated, delayed and spread. Packet burst 310 shows ten packets closely spaced in time. Duplicated, delayed, and spread (DDS) packets 320 are duplicates of the packets in burst 310. In some embodiments, DDS packets may have some minor differences from the packets in burst 310. For example, a TTL value or other value may be modified in order to keep the packets from being duplicated again.

Packet burst 310 may include any type of packet destined for any type of recipient. In some embodiments, packets in burst 310 are multicast packets destined for a client node in a wireless network. In other embodiments, the packets in burst 310 are packets that will traverse a wireless link, but are not destined for a wireless client. In general, packets in burst 310 may be any type of packet that may benefit from the forward error correction provided by duplication, delay, and spreading.

Figure 4:
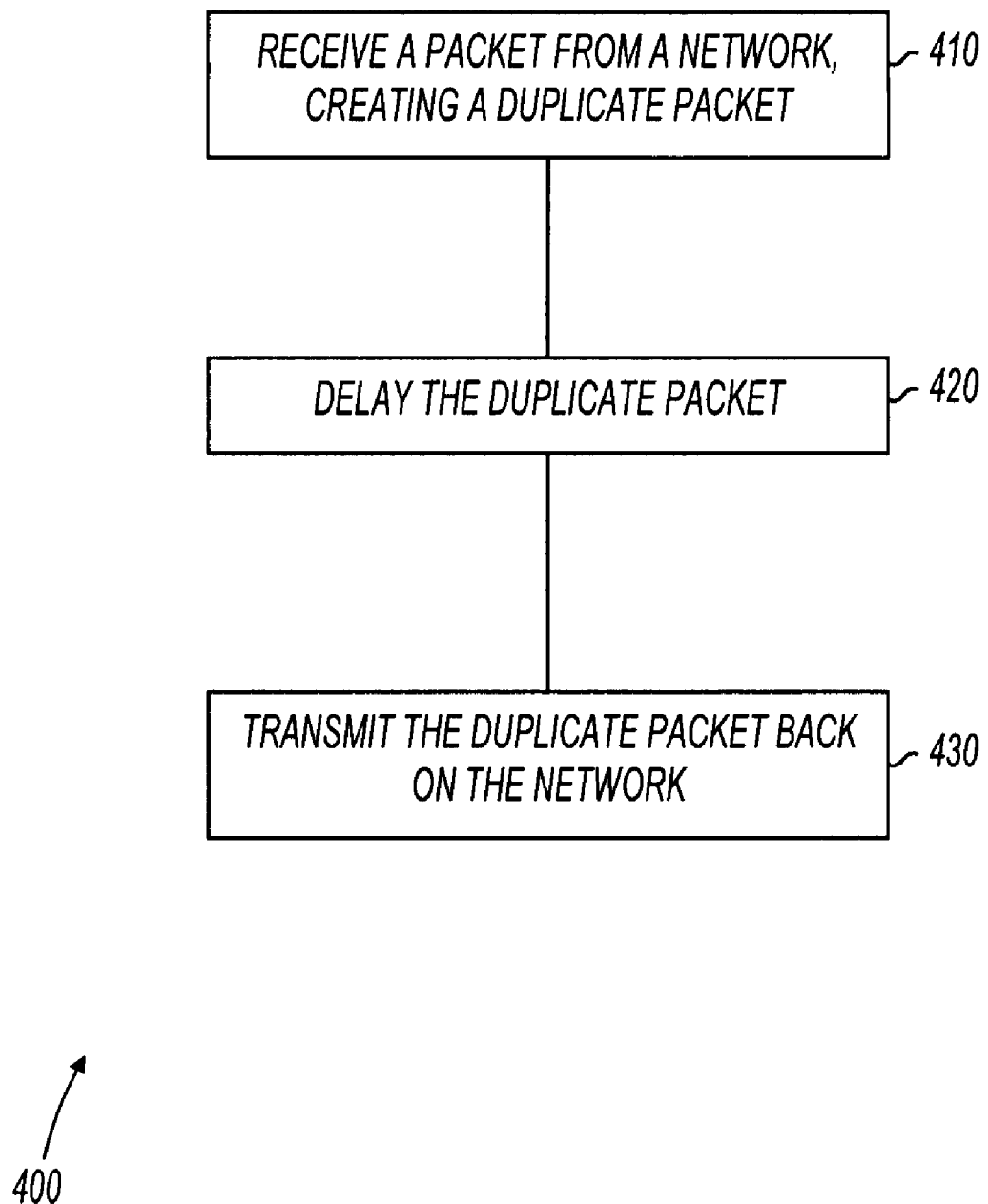
FIG. 4 shows a flowchart in accordance with various embodiments of the present invention.

FIG. 4 shows a flowchart in accordance with various embodiments of the present invention. In some embodiments, method 400, or portions thereof, is performed by a forward error correction server in network. In other embodiments, method 400 is performed by a processor within a computer. Method 400 is not limited by the particular type of apparatus performing the method. The various actions in method 400 may be performed in the order presented, or may be performed in a different order. Further, in some embodiments, some actions listed in FIG. 4 are omitted from method 400.

Method 400 is shown beginning with block 410 in which a packet is received from a network, creating a duplicate packet. For example, FEC server 150 (FIG. 1) or packet filtering/firewall component 210 (FIG. 2) may receive packets that are destined for another network node (e.g., a wireless client in a WLAN). By receiving the packet, a duplicate is created. The original packet is still in the network on its way to its destination. The duplicate is now resident in the network node performing the actions of 410. In some embodiments, many packets are received from the network at 430. For example, a packet filter may selectively allow packets to pass and block all others. The packet filter may be set to pass packets that have certain characteristic (e.g., multicast, video, etc) and/or are addressed to a particular address or port.

At 420, the duplicate packet is delayed. In some embodiments, multiple packets are delayed. They may be delayed various amounts to spread the packets out in time as shown in FIG. 3. At 430, the duplicate packet is transmitted back on the network. When multiple packets are received, duplicated, delayed, and spread, then the network has the original packet burst as well as the DDS packets as shown in FIG. 3.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An apparatus comprising:
a first network interface to receive packets from a local wireline network using a packet filter component that only passes multicast packets with a particular time-to-live (TTL) parameter value destined for a node on a wireless network;
a duplicate component that duplicates packets that pass through the packet filter component;
a packet delay component to delay packets received from the local wireline network and provides a varying amount of delay to different packets, and comprises a network emulator having a quality of service (QoS) component to delay and jitter the packets in time;
a component to modify the TTL parameter value to a known value, of the delayed packets to prevent further reception and duplication; and
a second network interface to transmit the delayed packets onto the local wireline network as duplicate packets to effect forward error correction through duplicate, delay, and spread (DDS) of multicast packets destined for the node on the wireless network.

2. The apparatus of claim 1 wherein the packet delay component provides a varying amount of delay to different packets.

3. The apparatus of claim 1 wherein the packet delay component comprises a network emulator having a quality of service (QoS) component to delay and jitter the packets in time.

4. A method comprising:
receiving packets from a local wireline network;
filtering only multicast packets with a particular time-to-live (TTL) parameter value destined for a node on a wireless network;
duplicating the multicast packets that are filtered;
delaying the multicast packets such that spreading the plurality of packets out in time by delaying each of the plurality of packets by a different amount;
modifying the TTL parameter value of the delayed multicast packets to a known value, to prevent further reception and duplication; and
transmitting the delayed multicast packets back on to the local wireline network as duplicate packets to effect forward error correction through duplicate, delay, and spread (DDS) of multicast packets destined for the node on the wireless network.

5. The method of claim 4 wherein:
delaying the multicast packets comprises spreading the plurality of packets out in time by delaying each of the plurality of packets by a different amount.

* * * * *